2 Sheets—Sheet 1

C. E. ALBRO.
Hoisting Apparatus.

No. 9,153. Reissued April 13, 1880.

Witnesses

Wm G. Buttorr

Inventor

Chas. E. Albro.

By his atty

N. PETERS, PHOTO-LITHOGRAPHER, WASHINGTON, D. C.

2 Sheets—Sheet 2.

C. E. ALBRO.

Hoisting Apparatus.

No. 9,153. Reissued April 13, 1880.

Witnesses

Wm. G. Button

Inventor

Chas. E. Albro

By his atty

N. PETERS, PHOTO-LITHOGRAPHER, WASHINGTON, D. C.

UNITED STATES PATENT OFFICE.

CHARLES E. ALBRO, OF CORTLAND VILLAGE, NEW YORK.

HOISTING APPARATUS.

SPECIFICATION forming part of Reissued Letters Patent No. 9,153, dated April 13, 1880.

Original No. 200,961, dated March 5, 1878. Application for reissue filed March 9, 1880.

*To all whom it may concern:*

Be it known that I, CHARLES E. ALBRO, of the village of Cortland, in the county of Cortland and State of New York, have invented new and useful Improvements in Hoisting Apparatus, which improvements are fully set forth in the following specification and accompanying drawings, reference being had to the said drawings, and to letters and figures of reference marked thereon.

The object of my invention is to provide a self-sustaining hoisting apparatus which may be on the differential principle. The mechanism of the same is placed in a suitable frame-work or shell, so that it can be used, like an ordinary pulley-block, to raise and lower heavy weights, as required in machine-shops and for the various other purposes for which the ordinary pulley-block and tackle and differential pulleys are now used.

My invention relates to that class of hoisting apparatus in which the mechanism of the same is placed in a suitable frame-work, and can be hung up or suspended, like an ordinary pulley-block; and my invention consists in a suitable frame, in which is journaled a shaft carrying one or more pulleys, and also one or more worm-gear wheels, in combination with one or more screws mounted in bearings detachably secured to the frame, said screws being adapted to mesh with the worm-wheels, thereby making the common endless screw, and being driven by a drive-wheel, the whole being constructed to operate as more fully hereinafter specified.

Figure 1:
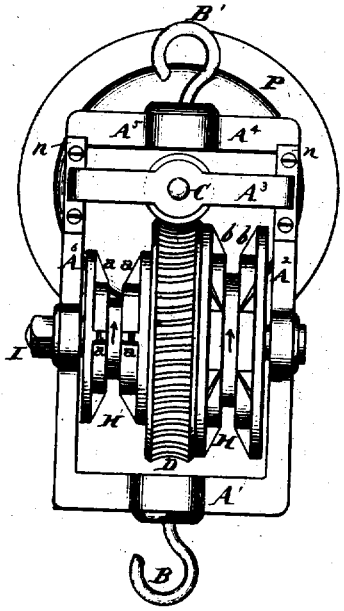
Figure 2:
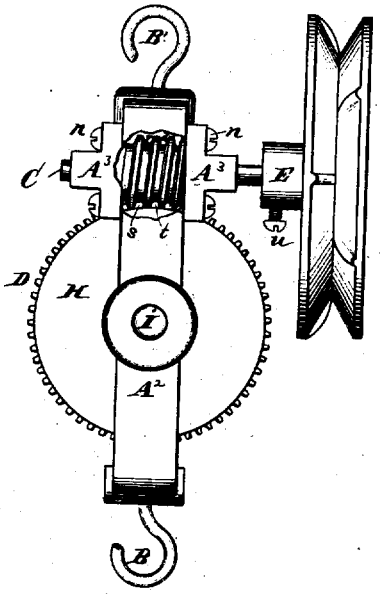
Figure 3:
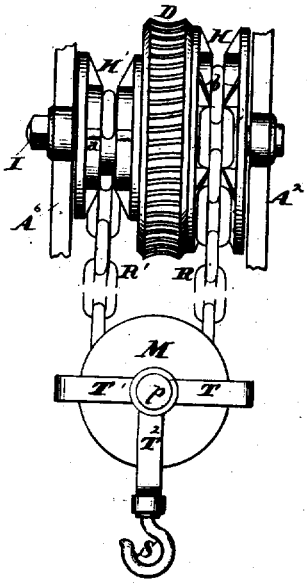
Figure 4:
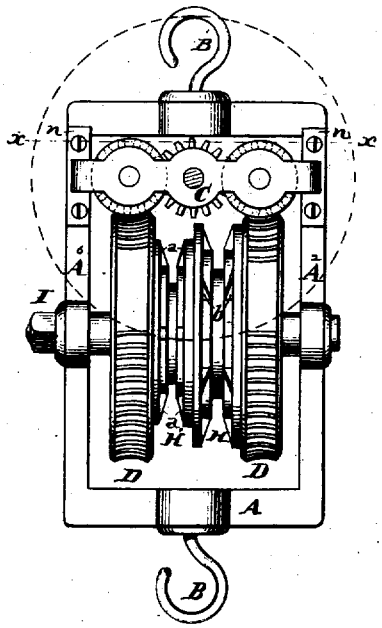
Figure 5:
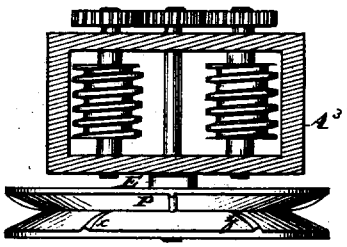

In the drawings, Figure 1 is a side view of my self-sustaining hoisting apparatus. Fig. 2 is a plain side view of another side of the apparatus, with part of the side broken away, showing the endless screw. Fig. 3 represents a front view of the wheel part of the endless screw and the pulleys, with a portion of the supporting-frame. Fig. 4 represents a view showing the wheel part of the two endless screws, the connecting spur-wheels, and a different arrangement of the chain-pulleys with the supporting-frame. Fig. 5 represents a horizontal sectional view on the line *x x* of Fig. 4.

In the drawings, the same letters on the different figures indicate the same parts.

In the drawings, A′, $A^2$, $A^3$, $A^4$, $A^5$, and $A^6$ is the frame-work, which is made in the form shown in the different figures, and of metals of sufficient size and strength to stand the strains to which it will be subjected. B and B′ are swivel-hooks on this frame. Their use is evident. D is the wheel part of the endless screw. Fastened rigidly to the wheel part D are one or more chain-pulleys, H H′, all of which revolve on the shaft or axle I I′. In chain-wheel H, *b b b*, and in chain-wheel H′, *a a a* are sprockets to keep the chain from slipping or sliding. P is the drive-pulley, the axle C of which has the screw part of the endless screw, as shown in Fig. 2, the said axle C having bearings in the parts $A^3$ and $A^3$ of the said frame-work, which parts are fastened to the other part by the screws *n n*.

In Fig. 2 *t* and *s* are teeth on the wheel, and *r* and *d* threads of the screw, showing how they engage each other.

The drive-pulley P is fastened to the axle C by the hub E and screw J. This drive-pulley P has sprockets *x*, *y*, and *z* in its concave rim, for the purpose of preventing the endless rope or chain used thereon from slipping or sliding.

In Fig. 3 M is the sheave of the snatch-block; *p*, the axle of the same. T, T′, and $T^2$ are guards. S is a hook in the same.

In the construction of all the parts of my apparatus I make use of materials of such a size and strength as will stand all the strains to which the apparatus will be subjected in the use for which it is intended.

Having thus described the construction of my apparatus, I will now proceed to describe its use and operation.

The frame-work is suitably suspended by the swivel-hook B′. Over the chain-pulleys H and H′ is placed the chain. R and R′ is the chain. This chain then passes under sheave M, and the weight to be raised is connected with the hook S. If the chain-pulleys H and H′ are constructed with different diameters, then the chain R R′ passes over the said pulleys on different sides of them, as shown in Fig. 3, so that the chain R′ may unwind while the chain R winds up, or vice versa. The chain R and R′ can be made endless.

By this construction it will be seen that a differential motion is produced, and that comparatively little power is required to turn the pulley P, as the thrust on the screw on the axle C is only slight.

It will readily be further seen that the screw on axle C, when turned by pulley P, imparts motion to the wheel part D; but the wheel part D cannot in any way impart motion to the screw on the axle C, from which it is plain that the apparatus is self-sustaining, and the weight must remain suspended at any point desired, and cannot run down.

It will be seen that when the chain is put on the chain-pulleys H and H′, as shown in Fig. 3, the weight is raised very slowly; but when greater speed is required with a corresponding loss of power, I put the chains R and R′ on the chain-pulleys H and H′, both on the same side, so that they both wind up, as shown by the arrows in Fig. 1; but when put on in this way power is exchanged for space and time.

The chain R can be put, if desired, on only one pulley, as H, the other end being put on the hook B; or the other end may be hitched direct to the weight to be raised. In this latter case one chain-pulley may be substituted in place of the two chain-pulleys H and H′, Fig. 4.

It will be readily seen that the important feature of my invention is the endless screw, with one or more chain-pulleys fastened rigidly to the wheel part of the said endless screw, and that the said chain-pulleys can, if desired, be made to vary more in diameter than the sheaves in the ordinary differential pulley, for the reason that the screw part of the said endless screw makes my apparatus absolutely self-sustaining, and it cannot run down; and, in addition, I get all the advantages of the power produced by the said endless screws.

It will be further seen that when great power is not required I can dispense with one of the said chain-pulleys, and let the chain pass over the other one, and thus form a self-sustaining hoisting apparatus, which will be found cheap and convenient in many places where great power is not required. Where very great power is required, and there may be danger of tearing the teeth off the wheel part D or the thread of the screw part on the axle C, I make use of two endless screws connected together by suitable spur-gearing, the wheel parts of the said endless screws being where the chain-pulleys H and H′ are in Fig. 1, and next to $A^2$ and $A^6$, and one or more chain-pulleys between the said wheel parts of the said endless screws.

In the form and construction of the frame-work A′, $A^2$, $A^3$, $A^4$, $A^5$, and $A^6$ the form shown need not be exactly followed; but the frame-work must be made strongly and substantially, with proportions adapted to the use for which it is intended.

I am aware that differential pulleys operated by an endless screw have heretofore been employed in hoisting apparatus, and this I do not claim broadly.

What I claim is—

1. In the combination with the wheel part of the endless screw, the differential pulleys mounted at each side thereof, and the supporting-frame of the screw part journaled in detachable bearings $A^3$, the whole constructed and arranged substantially as specified.

2. In a hoisting apparatus, the combination, with one or more pulleys of the wheel part, of two endless screws located one on each side of the pulleys and on the same shaft, and two screw parts gearing into said wheel parts, substantially as and for the purpose specified.

3. In a hoisting apparatus, the combination, with one or more pulleys of the wheel part, of two endless screws located one on each side of the pulleys and on the same shaft, and two screw parts gearing into said wheel parts and journaled in detachable bearings, substantially as and for the purpose specified.

4. In a hoisting apparatus, the frame-work A′ $A^2$ $A^3$ $A^4$ $A^5$ $A^6$ and swivel-hooks B B′, substantially as described, in combination with one or more endless screws, the differential pulleys H H′, drive-wheel P, and axle or shaft I I′, all substantially in the manner and for the purpose herein shown and specified.

In testimony of which invention I hereunto set my hand.

CHAS. E. ALBRO.

Witnesses:
R. S. CHILOP,
ANDW. J. BOSWELL.